June 13, 1967
C. E. WEBB
3,325,783
MOTOR VEHICLE LIGHT ENERGIZATION INDICATING
AND WARNING APPARATUS
Filed Dec. 7, 1964
FIG.1
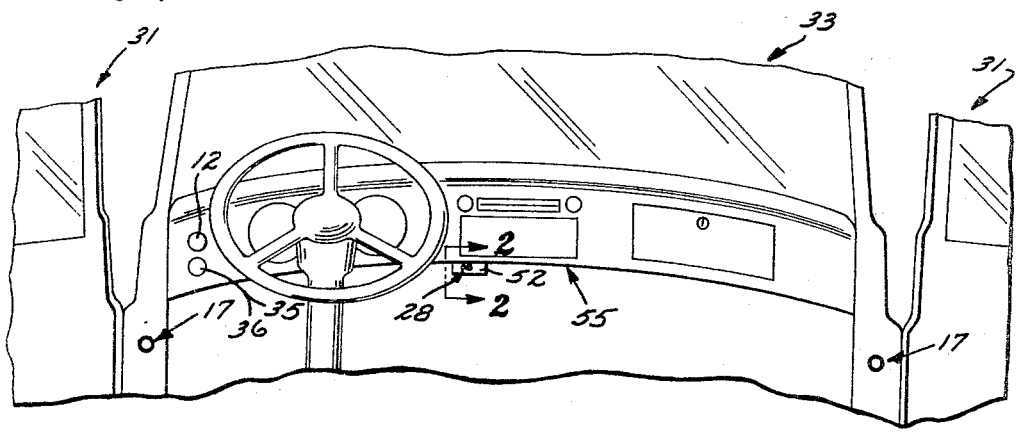
FIG.2
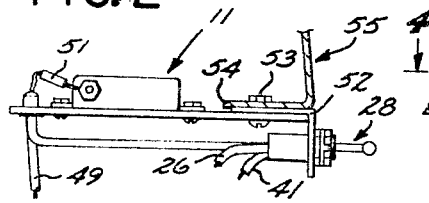
FIG.3     FIG.6
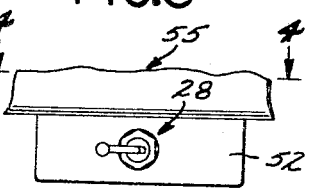 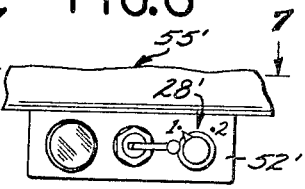
FIG.4     FIG.7
FIG.5     FIG.8
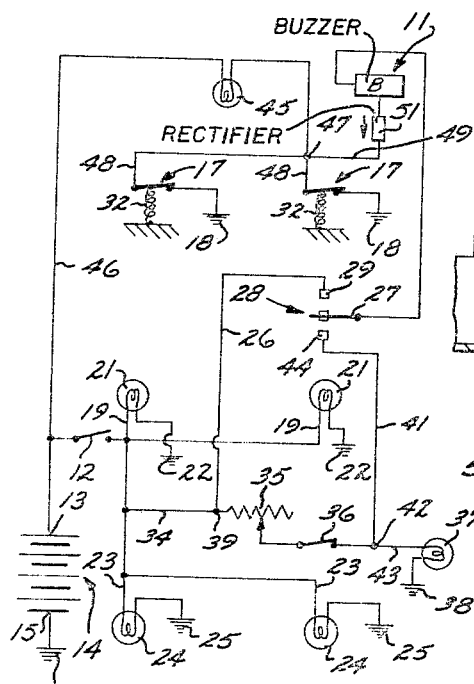
INVENTOR.
CARL E. WEBB

United States Patent Office 3,325,783
Patented June 13, 1967

3,325,783
MOTOR VEHICLE LIGHT ENERGIZATION INDI-
CATING AND WARNING APPARATUS
Carl E. Webb, 6226 Eileen Ave.,
Los Angeles, Calif. 90043
Filed Dec. 7, 1964, Ser. No. 416,376
10 Claims. (Cl. 340—52)

Generally speaking, the present invention relates to a motor vehicle light energization indicating and warning apparatus which will indicate and warn a motorist who is in the act of leaving a motor vehicle, that at least certain portions of the motor vehicle lighting apparatus or system, such as headlights, tail lights or the like, are still electrically energized, so that the motorist will realize that if he intends to leave the motor vehicle for any length of time, he should turn off or open a corresponding lighting system control switch, so that said headlights, tail lights or any other portions of the lighting system which have been inadvertently left in electrically energized condition, will be de-energized and will not drain the battery during the period of time while the motorist stays away from the motor vehicle. This is important since quite often when a motorist is driving a motor vehicle after dark or whenever visibility conditions are relatively poor, he will turn on his head and tail lights to enhance visibility for safety purposes and in order to comply with local driving laws and the like. However, when the motorist reaches his destination and parks his automobile, he may forget to turn off the headlights and tail lights prior to leaving the automobile and when he returns to the automobile later on he may find that the very substantial drain on the battery which has occurred during the period of time when he was away from the motor vehicle has substantially discharged the motor vehicle's battery to a degree such that it is now incapable of supplying enough electrical energy to the starter motor or the motor vehicle to start the engine—thus, the motor vehicle will be effectively rendered incapable of operation until either the battery is again charged at a garage, service station, or the like, or until a replacement battery is used for energizing the motor vehicle starter motor.

It should be noted that the apparatus of the present invention will completely prevent the above-mentioned prior art type of inadvertent discharge of the motor vehicle's battery because of the fact that the various elements of the motor vehicle lighting circuitry system, such as headlights, tail lights or the like, are accidentally left in energized condition for a long period of time when the motor vehicle is parked and the engine is not running and when the generator or alternator of the motor vehicle is, therefore, not supplying any electrical energy to the headlights, tail lights, and/or battery of the motor vehicle.

The novel apparatus of the present invention is so arranged as to produce a perceptible warning signal when the motorist opens the door of the motor vehicle to leave same, if the above mentioned lighting circuit or system of the motor vehicle, including headlights, tail lights or the like, is in electrically energized condition.

The perceptible warning signal, in one preferred exemplary form of the invention, may comprise an audibly perceptible warning signal produced by a sound-producing buzzer means, or the like, which is ideally suited to immediately catch the attention of the motorist as he opens the motor vehicle door and steps out preparatory to leaving the parked motor vehicle. As soon as the motorist, even though he may have already partially stepped out of the motor vehicle, hears the warning buzzing sound produced by the buzzer means, he will immediately realize that he has inadvertently left the headlights and tail lights on, and he will normally reach into the motor vehicle and turn them off by opening a main lighting system control switch, which is usually located on the instrument panel or dashboard of the motor vehicle, although it may be located in any of a variety of different positions, all of which are within the broad scope of the present invention.

In one preferred form of the present invention, it may be either provided with effective inactivation switch means for controllably inactivating the warning signal-producing means or may be arranged to be controllably connected through a pre-existing effective inactivation switch means in the motor vehicle, such as the conventional switch controlling the instrument panel lighting circuit in a motor vehicle, or any other functionally equivalent arrangement may be provided, so that a motorist may selectively and only when desired to override the warning signal-producing means, effectively inactivate same for a period of time, after which it is normally again reactivated and placed in condition for warning operation in the manner referred to above.

For example, such inactivation of the warning signal-producing means may be desirable when a motorist wishes to hold one or more of the motor vehicle doors in open position at night while the headlights and tail lights are on. This is usually a temporary condition such as when passengers are being helped into or out of the motor vehicle, or when it is being loaded or unloaded. It is obvious that during the short period of time when such a loading or unloading operation is being conducted and one or more of the motor vehicle doors is open while the headlights and tail lights are on, it is not desirable that the warning signal-producing buzzer means continues to produce a loud, audibly perceptible buzzing sound, since this might be distracting to other people nearby, and, therefore, the selective operation of the inactivation switch means as referred to above for temporarily inactivating the apparatus during the short period of time when such a loading or unloading operation is being carried on, is highly desirable and will eliminate the warning signal or sound.

However, upon completion of such a temporary vehicle loading or unloading operation, it is highly desirable that the inactivation switch be again moved into the previous activation position so that the warning apparatus will be reactivated and ready to subsequently provide a warning whenever the motor vehicle door is subsequently opened while the lighting system is energized.

Therefore, in one preferred form of the invention, an inactivation indicating means, such as a jewel light means, or the like, may be arranged to be energized only when said inactivation switch means is moved into the above-mentioned inactivating relationship with respect to the warning signal-producing means whereby to thus indicate that said warning signal-producing means is in said inactivated condition. Obviously, whenever the motorist gets back into the motor vehicle after having had the inactivation switch means in such an inactivating position for the temporary vehicle loading and unloading purposes outlined above, he will immediately notice that the inactivation indicating jewel light means is glowing, and this will, of course, let him know that he should operate said inactivation switch means back into the reactivated relationship for placing the entire apparatus in condition for a subsequent warning usage in the manner previously referred to above.

It is a further object of one preferred form of the present invention to utilize the conventional door-operated switch means provided in a great many motor vehicles and normally in circuit with a motor vehicle body interior light or lamp means so as to normally illuminate the interior of the motor vehicle whenever either door thereof is opened. Using such pre-existing door-operated switch means for operating the warning apparatus of the present invention reduces the number of parts required and, consequently, reduces the cost thereof, both with respect to equipment and with respect to the installation of the warning apparatus in a pre-existing motor vehicle. However, it should also be noted that, in certain forms, the present invention may positively include such door-operated switch means along with the remainder of the apparatus. This is, of course, necessary when installing the warning apparatus of the prevent invention in a motor vehicle which does not normally have such pre-existing door-operated switch means for emergizing the motor vehicle body interior light or lamp means in the manner referred to above.

With the above points in mind, it is an object of the present invention to provide a novel warning apparatus for inidcating the energization of a motor vehicle lighting system and having the advantages referred to herein and including the features referred to herein, generically and/or specifically, and individually or in combination, and which is of extremely simple, inexpensive construction adapted for mass manufacture at very low cost whereby to be conducive to widespread use thereof and which may initially comprise part of the electrical circuitry of a motor vehicle at the time of original manufacture thereof, or which may comprise attachment apparatus adapted to be subsequently installed in a pre-existing motor vehicle in a very simple and easy manner.

Further objects are implicit in the detailed description which follows hereinafter (which is to be considered as exemplary of, but not specifically limiting, the present invention), and said objects will be apparent to persons skilled in the art after a careful study of the detailed description which follows hereinafter.

For the purpose of clarifying the nature of the present invention, several exemplary embodiments of the invention are illustrated in the hereinbelow-described figures of the accompanying single drawing sheet and are described in detail hereinafter.

FIG. 1 is a fragmentary, reduced-size view of the interior portion of a motor vehicle adjacent to the location where a motor vehicle driver normally sits, and shows a part of the interior portions of the motor vehicle immediately ahead of such a motor vehicle driver and which would normally lie within his field of view when seated in the motor vehicle in driving relationship with respect thereto. Furthermore, this view shows one exemplary form of the present invention mounted below a portion of the dashboard or instrument panel of the motor vehicle and additionally shows the two motor vehicle doors fragmentarily and in open relationship with respect to a pair of motor vehicle door-operated switches which energize the warning signal-producing means of the prevent invention when either door is open while the motor vehicle's main lighting circuit portion, such as that including headlights and tail lights, is in electrically energized condition.

FIG. 2 is a larger scale, fragmentary view, partly in section and partly in elevation, and with certain wires comprising the wires for connecting the apparatus to the remainder of the electric circuit means best shown in FIG. 5 being broken away for reasons of drawing simplification.

FIG. 3 is a larger scale, front elevational view of the apparatus of FIG. 2 as it would appear when viewed in elevation from the right of FIG. 2 and as it appears, drawn to a smaller scale, however, in FIG. 1.

FIG. 4 is a view taken substantially along the plane indicated by the arrows 4—4 of FIG. 3 and comprises a top plan view with all parts in full top plan elevation with the exception of the front wall portion of the dashboard or instrument panel of the motor vehicle, which is shown in cross-section. This view also illustrates the movement of the selector switch means by solid line and broken line showings of different positions thereof.

FIG. 5 is an electrical schematic view illustrating one exemplary form of the present invention in electrically connected relationship with respect to corresponding electrical lighting circuit portions of a motor vehicle.

FIG. 6 is a view similar to FIG. 3 but illustrates a slight modification of the invention.

FIG. 7 is a view taken substantially along the plane indicated by the arrows 7—7 of FIG. 6 and comprises a top plan view with all parts in full top plan elevation with the exception of the front wall portion of the dashboard or instrument panel of the motor vehicle, which is shown in cross-section. This view also illustrates energization of the inactivation indicating jewel light means when the inactivation switch means is moved into inactivating relationship with respect to the wanirng signal-producing means, such as is shown fragmentarily in broken lines in FIG. 8.

FIG. 8 is a fragmentary, electrical schematic view of a slight modification of a portion of the electrical schematic circuit arrangement shown in FIG. 5—this modification comprising the inclusion of an inactivation switch means in circuit with the warning signal-producing means and controllably manually operable into an effectively inactivated relationship where it energizes an inactivation indicating jewel light means. Otherwise, the modification shown fragmentarily in FIG. 8 is similar to the first arrangement shown schematically in FIG. 5.

Generally speaking, the exemplary first form of the invention illustrated in FIGS. 1–5 may be said to comprise perceptible warning signal-producing means, such as generally designated at 11, adapted to be connected in series with a main motor vehicle lighting control switch means 12 which, in turn, is connected to one terminal 13 of an electrical power supply means, such as the battery indicated generally at 14 in FIG. 5 and which has its opposite terminal 15 grounded as indicated at 16. Said warning signal-producing means 11 is also connected through automobile door-operated switch means, such as the two generally indicated at 17 in both FIGS. 1 and 5, to ground as indicated at 18 in FIG. 5 which, of course, comprises a ground connection back to the terminal 15 of the battery 14.

It will be noted that the main lighting system control swich 12 in the arrangement illustrated in FIGS. 1–5 actually comprises a part of a main lighting circuit portion comprising the two leads 19 connected in parallel to the two headlights 21, the opposite ends of which are grounded, as indicated at 22, and also comprising the two leads 23 which are connected in parallel to the two tail lights 24, the opposite ends of which are grounded as indicated at 25. Thus, it will be seen that whenever the main lighting system control switch 12 is closed, battery 14 is effectively connected to each of the two headlights 21 and to each of the two tail lights 24 which are, therefore, electrically energized, and it should also be noted that at the same time, the lead 26 of the warning apparatus of the present invention is also electrically energized and will energize the warning signal-producing buzzer means 11 if the movable element 27 of the selector switch means generally indicated at 28 is moved into electrical engagement with the upper contact member 29 shown in FIG. 5. This will, of course, mean that opening either of the two doors generaly designated at 31 in FIG. 1 will allow the corresponding one of the two automobile-door-operated switch means 17 (shown in both FIGS. 1 and 5) to be opened under the action of the corresponding biasing spring means, such as diagrammatically indicated at 32 in FIG. 5, but which may comprise coil compression biasing spring means, tension biasing spring means, torsion spring means, cantilever spring means, or any other suitable type. Closure of said door-operated switch means 17 will effectively close the circuit through the warning signal-producing buzzer means 11 when the headlights 21 and tail lights 14 are on and will produce a loud buzzing sound warning a motorist who is leaving the motor vehicle generally designated at 33 through either of the open doors 31 that he has left the headlights 21 and tail lights 24 on. Normally, the motorist will then open the main lighting system control switch 12 and, of course, the headlights 21, the tail lights 24, and the warning signal-producing buzzer means 11 will all be de-energized.

It should also be noted that the main lighting circuit portion previously referred to above as including the leads 19 and 23 in addition to the main lighting control switch 12, also includes the lead 34 connected thereto, and in series with the main lighting system control switch 12; said lead 34 having a manually adjustable rheostat means 35 connected at one end 39 thereto and connected at the opposite end through an on-off switch 36 to one or more instrument panel lights, such as the one shown at 37, and then to ground as indicated at 38 in FIG. 5. This conventional arrangement makes it possible to control the amount of current flow through the instrument panel light 37 by adjusting the rheostat 35, and thus correspondingly adjusting the lighting level of the illumination produced by the instrument panel light 37 and also making it possible to completely de-energize the instrument panel light 37 by opening the on-off switch 36.

In many motor vehicles it is customary to physically combine the main switch 12, the rheostat 35, and the instrument panel on-off switch 36 in one physical structure, with the main switch 12 being operated by longitudinal reciprocation, and with the rheostat 35 being operated by rotary movement and with the on-off switch 36 being also operated by rotary movement at the extreme limit of the adjustment of the rheostat 35. In such cases, all that would be physically seen on the dashboard in FIG. 1 would be the switch shown at 12. However, for purposes of drawing clarity, the instrument panel light control rheostat 35 and on-off switch 36 are shown as a joint structure of the rotary type mounted separate and distinct from the main light system control switch 12. However, it should be clearly understood that this is done for reasons of drawing clarity only and that they may all be combined in one physical structure as referred to above, if desired.

It should be noted that the lead 26 to the selector switch 28 is actually connected at the junction terminal 39 to the instrument panel lead 34 and that another lead 41 is connected in parallel with respect to the lead 26 from a terminal 42 of the instrument panel circuit 43 to a lower contact element 44 of the previously mentioned selector switch 28. The arrangement is such that if the movable element 27 of said selector switch 28 is moved downwardly into engagement with the contact element 44, then the terminal 13 of the battery 14 is connected through the main lighting system control switch 12, when closed, through the instrument panel light control rheostat 35 and on-off control switch 36, when closed, through said selector switch 28 to the warning signal-producing buzzer means 11 and either one of the automobile door-operated switch means 17, when a corresponding one of the doors 31 is open, to ground at 18, thus completing or closing an electrical circiut means and allowing energization of the warning signal-producing buzzer means 11 so that a loud warning buzzing sound or signal will be produced for warning a motorist who is about to leave the automobile 33 through either one of the open doors 31 that he has left his headlights 21 and tail lights 24 energized.

In other words, the selector switch means 28 allows either of the two parallel circuit portions 26 or 41 to be effective and, in the first case, the circuit portion 26, when effective, completely bypasses the instrument panel light circuit portion 43, the control rheostat 35 and on-off switch 36 thereof. However, in the second case, the circuit portion 41 is effective and places the operation of the warning signal-producing buzzer means 11 under the control of the instrument panel light rheostat means 35 and on-off switch means 36. In other words, under such circumstances, when the selector switch means 28 has been operated to the down position, the opening of the instrument panel light control switch means 36 will effectively inactivate the entire apparatus, and the instrument panel light control switch means 36 may be said to effectively comprise inactivation switch means for the temporary overriding purposes referred to broadly hereinbefore. On the other hand, if the instrument panel light control switch means 36 is placed in normally open position by a motorist and is normally kept in that open relationship, then the selector switch means 28 may normally be moved to the up position for placing the warning buzzer means 11 in activated relationship ready for operation whenever the headlights 21 and tail lights 24 are energized and either car door 31 is opened. In such an arrangement, temporary overriding and inactivating of the system may be accomplished by merely flicking the selector switch means 28 from the up position to the down position, since the instrument panel light control on-off switch means 36 has been previously placed in open relationship.

It should be noted that, in the arrangement illustrated schematically in FIG. 5 and physically in FIGS. 1–4 the automobile door operated switch means 17 actually comprise part of a circuit for energizing an automobile body interior lamp of light means 45, such as is conventionally found at the top interior of an automobile body and such as is frequently referred to as the dome light. It will be noted that said automobile body interior lighting circuit portion includes a lead 46 which bypasses the main lighting control switch 12 and directly connects to the terminal 13 of the battery 14 at one end and which at its opposite end passes through the automobile body interior light 45 and then down to a junction point 47 where it is connected in parallel by two lead portions 48 to the two previously mentioned automobile door-operated switch means 17 which are grounded as indicated at 18. Since the warning signal-producing buzzer means 11 is also connected by a lead 49 to said junction portion 47 in parallel to said automobile body interior lighting circuit portion lead 46 so as to also pass through the same two automobile door-operated switch means 17, it is necessary to provide a rectifier means, such as the diode indicated at 51 (which may be located at any place in the circuit between points 39 and 47), in order to prevent erroneous energization of the warning signal-producing buzzer means 11 from said automobile body interior lighting circuit lead 46. However, it should be noted that, in the event that the warning apparatus of the present invention is installed in a motor vehicle which does not have a conventional automobile body interior lighting circuit, such as that shown at 46 in FIG. 5 and which, therefore, normally also does not have automobile door-operated switches, such as shown at 17 in FIG. 5, such automobile door-operated switches may comprise positively included parts of the present invention, and the rectifier means 51 may be eliminated.

It should also be noted that, in the exemplary first form of the invention illustrated, the selector switch means 28, the warning signal-producing buzzer means 11, the recifier means 51, and the electrical lead portions 26, 41, and 49 are carried by a metallic mounting chassis 52 which is adapted to be fastened by suitable fastening means, such as the threaded fastening means shown at 53 (or by mounting clip means, rivet means, soldering, brazing, welding, or any other substantially functionally equivalent means), underneath the lower horizontally directed lip portion 54 of a motor vehicle instrument panel or dashboard, such as is generally indicated fragmentarily at 55, thus conveniently physically mounting the entire device for convenient operation of the selector switch means 28 and for convenient radiation of sound from the sound-producing buzzer means 11 to the ears of a motorist who is leaving or about to leave the automobile through one of the open doors 31 while the lights remain on. However, the mounting arrangement just described is exemplary only and is not to be construed as specifically limiting the invention thereto.

FIGS. 6–8 illustrate a slight modification of a portion of the invention and, therefore, functionally similar parts are indicated by similar reference numerals, primed, however, In this modification, it will be noted that the fragmentary circuit portion shown in FIG. 8 is adapted to have the movable switch element 27' of the selector switch means 28', the terminal 39' at the lower end of the lead 26', and the terminal 42' at the lower end of the lead 41' connected to the corresponding unprimed portions of the electric circuit shown schematically in FIG. 5 and are adapted to replace intervening portions of the electric circuit shown schematically in FIG. 5.

Thus, it will be understood that the modified arrangement illustrated schematically in FIG. 8 and physically in FIGS. 6 and 7 includes an additional inactivation switch means, generally designated at 56, which is a single pole double throw switch means adapted, when in the solid line position shown in FIG. 8, to cause the entire device to be functionally equivalent to, and operate in substantially the same manner as, that previously described in connection with the first form of the invention illustrated schematically in FIG. 5. However, when said inactivation switch means 56 is moved upwardly into the broken line inactivation position shown in FIG. 8, the circuit to the warning signal-producing buzzer means, as shown at 11 in FIG. 5 of the first form of the invention, is effectively broken and inactivated or deactivated. However, when this is done, the inactivation indicating jewel light means 57, is effectively energized so that the jewel light 57 will into the solid line position shown as FIGS. 7 and 8, which motorist will realize that the system is in inactivation condition when he next returns to the motor vehicle, and will immediately flick the inactivation switch means 56 into the solid line position shown in FIGS' 7 and 8, which will effectively reactivate the entire warning system for subsequent operation in the manner described in detail hereinbefore in connection with the first form of the invention illustrated schematically in FIG. 5.

About the only other difference of the modified form of the invention illustrated in FIGS. 6–8 is the fact that the selector switch means 28' has a different physical appearance in this modification and is of the rotary type adapted to be operated between the two positions indicated by the numerals 1 and 2 as best shown in FIG. 6, for the purpose of connecting either the upper contact element 29' to the movable switch element 27' when in the number 1 position, or for the purpose of connecting the movable switch element 27' to the lower contact element 44' when in the number 2 position. In other respects, this modification of the invention is substantially similar to the first form described in detail hereinbefore and illustrated in FIGS. 1–5, inclusive.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:

1. Motor vehicle light energization indicating and warning apparatus, comprising perceptible warning-signal-producing means, including series-connected rectifier means, adapted to be series-connected in circuit with headlight and tail light main control switch means of a motor vehicle, a motor vehicle electric power supply means, and at least one pre-existing motor vehicle door-operated switch means of the type adapted to be normally open when a corresponding motor vehicle door is closed and to automatically close when the motor vehicle door is opened and of the type provided with and connected in series with a motor vehicle body interior light circuit means portion and the motor vehicle electric power supply means, with said perceptible warning-signal-producing means and said series-connected rectifier means, when so series-connected to the door-operated switch means, being connected in parallel to the motor vehicle body interior light circuit means portion in a manner such that both the motor vehicle body interior light circuit means and said perceptible warning-signal-producing means are separately and individually series-connected in common to the motor vehicle door-operated switch means, said rectifier means being electrically positioned relative to said perceptible warning-signal-producing means in a forward-current-flow-permitting manner for allowing the forward flow of current therethrough, to and through the door-operated switch means when closed and series-connected thereto and for preventing undesired reverse-current-flow electrical energization of said warning-signal-producing means from the motor vehicle body interior light circuit means portion when the pre-existing motor vehicle door-operated switch means is open, thus, when so connected, effecitvely providing a warning-signal-producing means circuit portion and a motor vehicle body interior light circuit means portion connected in parallel with each other and in series with the motor vehicle electric power supply means and the motor vehicle door-operated switch means, common to both of the parallel-connected circuit portions, for electrically energizing said warning-signal-producing means whenever the headlight and tail light main control switch means is closed and the door-operated switch means is closed by the opening of a corresponding door of a motor vehicle whereby to produce a perceptible warning signal, thus warning a motorist in the act of leaving the motor vehicle that the headlight and tail light main control switch means is closed.

2. Apparatus as defined in claim 1, including de-energizing inactivation switch means effectively series-connected in circuit with said warning-signal-producing means, the headlight and tail light main control switch means, and the motor vehicle electric power supply means and controllably manually operable for effectively de-energizing and inactivating same when desired.

3. Apparatus as defined in claim 2, including inactivation indicating means electrically series-connected with respect to said inactivation switch means, the headlight and tail light main control switch means, and the motor vehicle electric power supply means for energization when said inactivation switch means is moved to an inactivating relationship with respect to said warning-signal-producing means whereby to indicate that said warning-signal-producing means is in said inactivated condition.

4. Apparatus as defined in claim 3, wherein said warning-signal-producing means, said rectifier means, and said inactivation switch means are provided with a mounting chassis having attachment means for controllable attachment with respect to a pre-existing instrument panel of the motor vehicle in a conveniently accessible position with respect to the normal position of a driver of the motor vehicle.

5. Apparatus as defined in claim 1, including selector switch means for controllably electrically connecting a motor vehicle instrument panel lighting circuit portion, including a control rheostat and a de-energizing switch means, between the headlight and tail light main control switch means and said warning signal-producing means when desired.

6. Apparatus as defined in claim 5, wherein said warning-signal-producing means, said rectifier means and said selector switch means are provided with a mounting chassis having attachment means for controllable attachment with respect to a pre-existing instrument panel of the motor vehicle in a conveniently accessible position with respect to the normal position of a driver of the motor vehicle.

7. Apparatus as defined in claim 5, including de-energizing inactivation switch means effectively series-connected in circuit with said warning-signal-producing means, the headlight and tail light main control switch means, and the motor vehicle electric power supply means and controllably manually operable for effectively de-energizing and inactivating said warning-signal-producing means when desired.

8. Apparatus as defined in claim 7, including inactivation indicating means electrically series-connected with respect to said inactivation switch means, the headlight and tail light main control switch means, and the motor motor vehicle electric power supply means for energization when said inactivation switch means is moved to an inactivating relationship with respect to said warning-signal-producing means whereby to indicate that said warning-signal producing means is in said inactivated condition.

9. Apparatus as defined in claim 8, wherein said warning-signal-producing means, said rectifier means, and said selector and inactivation switch means are provided with a mounting chassis having attachment means for controllable attachment with respect to a pre-existing instrument panel of the motor vehicle in a conveniently accessible position with respect to the normal position of a driver of the motor vehicle.

10. A warning apparatus electrically connected in circuit with a motor vehicle lighting system, comprising: a motor vehicle having a main lighting circuit portion including headlights, tail lights, and a headlight and tail light main control switch means in circuit therewith, a motor vehicle electric power supply means connected to said main lighting circuit portion so as to be series-connected with respect to said headlight and tail light main control switch means, a motor vehicle body interior light circuit means portion having an interior motor vehicle light series-connected therein and being provided with and series-connected to at least one motor vehicle door-operated switch means and together therewith comprising a complete motor vehicle body interior light circuit means series-connected to said motor vehicle electric power supply means in parallel to said headlight and tail light main control switch means, said motor vehicle door-operated switch means being of the type adapted to be normally open when a corresponding motor vehicle door is closed and to automatically close when the motor vehicle door is opened; audibly perceptible warning-signal-producing buzzer means, including series-connected rectifier means, series-connected in circuit with said headlight and tail light main control switch means, said motor vehicle electric power supply means, and said motor vehicle door-operated switch means, with said warning-signal-producing buzzer means and said series-connected rectifier means being connected in parallel to said motor vehicle body interior light circuit means portion up to its point of connection to said door-operated switch means in a manner such that both said motor vehicle body interior light circuit means portion and said warning-signal-producing buzzer means are separately and individually connected in common to said door operated switch means, with said rectifier means being electrically positioned relative to said warning-signal-producing buzzer means in a forward-current-flow-permitting manner for allowing the forward flow of current therethrough, to and through said door-operated switch means when closed and for preventing undesired reverse-current-flow electrical energization of said warning-signal-producing buzzer means from said motor vehicle body interior light circuit means portion when said door-operated switch means is open and for electrically energizing said warning-signal-producing means whenever said headlight and tail light main control switch means is closed and said door-operated switch means is closed by the opening of a corresponding door of said motor vehicle whereby to produce an audibly perceptible warning signal, thus warning a motorist in the act of leaving said motor vehicle that said headlight and tail light main control switch is closed and that, correspondingly, said headlights and tail lights, or other electrical power utilization apparatus controlled thereby, is energized.

References Cited
UNITED STATES PATENTS 2,799,843  7/1957  Savino _____ 340—52

NEIL C. READ, *Primary Examiner.*

A. WARING, *Assistant Examiner.*